United States Patent [19]
De Anda et al.

[11] 3,982,844
[45] Sept. 28, 1976

[54] TAPE FASTENING SYSTEM

[75] Inventors: Nicholas De Anda, Redondo Beach; Robert Ford Dyer, Rancho Palos Verdes, both of Calif.

[73] Assignee: Mattel, Inc., Hawthorne, Calif.

[22] Filed: Feb. 3, 1976

[21] Appl. No.: 655,022

[52] U.S. Cl. .............................. 403/211; 242/74.1; 24/136 K; 24/115 M
[51] Int. Cl.² ..................... F16B 11/00; B65H 75/28
[58] Field of Search ..... 24/73 BS, 263 SW, 263 FC, 24/136 K, 115 M; 242/74.1

[56] References Cited
UNITED STATES PATENTS 3,304,021  2/1967  Quenot .............................. 242/74.1
3,778,072  12/1973  Salomon .............................. 24/171

*Primary Examiner*—Bernard A. Gelak
*Attorney, Agent, or Firm*—John M. May; Stephen L. King

[57] ABSTRACT

Disclosed is a novel fastener for attaching flexible tape comprising a tri-laterally symmetric retainer and a receiving aperture such that a portion of the flexible tape wrapped around said retainer may be gripped and said aperture, the gripping force increasing when tension is supplied to said tape.

6 Claims, 6 Drawing Figures

TAPE FASTENING SYSTEM

BACKGROUND OF THE INVENTION

The background of the invention will be set forth in two parts.

1. Field of the Invention

The invention pertains generally to fastening devices, and in particular, to such fasteners as are suitable for use with flexible tapes.

2. Description of the Prior Art

Flexible tapes capable of transmitting in tension force from a first driving number to a second driven member are well known, and have the advantage, when compared to other transmission schemes such as gears and levers, of being relatively jam-free in operation when used to transfer impulses from a driving member to a driven member. In the prior art the conventional means of fastening the end of such tape to a mechanical member was by riveting the tape to itself at one end, thereby forming a loop which could be positioned about an appropriate pin provided on said member. However, such a prior art fastening means causes localized stresses in the tape and, if the rivet was not installed properly, could result in the tape tearing in the vicinity of the rivet or the rivet actually falling out. Furthermore, when such a prior art fastening means was used, the end of tape was not positively held in place, and, if subject to vibration when tension was being applied, could actually fall off and become disengaged from said member.

SUMMARY OF THE INVENTION

Accordingly, one object of the present invention is to provide a tape fastener which is relatively inexpensive to manufacture and install.

A second object of the present invention is to provide such a fastener which will not permit the tape to become dislodged or disengaged when subject to vibration.

Yet another object of the present invention is to provide a tape fastener that is securely held in place, but which may be non-destructively removed if required for repairs.

In accordance with these and other objects which will become evident to those skilled in the art of the present invention, there is provided a tri-laterally symmetric tape fastener having a tapered lead-in portion, a fastening portion of substantially constant cross-section, and an enlarged head portion. Preferably a loop is formed on the end of the tape and the tape then inserted into an appropriately shaped receiving aperture, whereupon the tape fastener may then be forced through the loop in said tape thereby securing it in said aperture. Alternatively, the tape to be fastened may be wrapped around the fastening portion of the fastener and then, together with the fastener, inserted in the aperture. In the preferred embodiment of the present invention, there is provided on the fastener a notched portion which engages a ledge provided as part of the aperture, thereby causing a snap fit secure against vibration between the fastener and the aperture, but permitting the fastener to be removed, if necessary.

BRIEF DESCRIPTION OF THE DRAWINGS

For a more detailed understanding of the present invention, reference is made to the following Detailed Description and the appended Drawings in which:

FIG. 5 is an exploded view showing how the fastener and tape are installed in the aperture; while

DESCRIPTION OF THE PREFERRED EMBODIMENT

Figure 1:
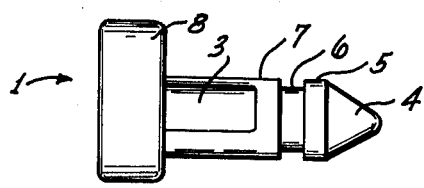
FIG. 1 represents a side view of a tape fastener in accordance with the present invention.
Figure 2:
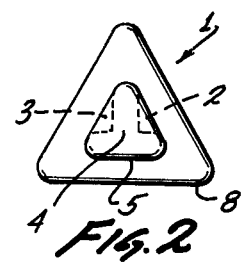
FIG. 2 represents an end view of the fastener shown in FIG. 1.

Referring now with particularity to FIGS. 1 and 2, it may be seen that a tape fastener in accordance with the present invention is of generally triangular or tri-laterally symmetric shape (see the end view of FIG. 2) although, for ease and convenience of molding, recessed portions 2 and 3 may be provided without affecting the operation of the fastener. Starting at the right-most portion of FIG. 1, it may be seen that the fastener 1 has disposed from one end to the other a first portion 4 in the form of a tapered lead for facilitating the insertion of the fastener into its aperture, a second portion 5 of constant essentially triangular cross-section, a third portion 6, also of constant cross-section, but smaller than that of constant cross-section portion 5, and a fourth portion 7 having essentially the same cross-section as constant cross-section portion 5. The purpose of smaller cross-section portion 6 is to provide a means for locking the fastener in place as will become more clear hereinafter.

Also provided as part of fastener 1 is a fifth portion 8 defining a head which has a cross-section larger than that of any other portion of the fastener. Although head portion 8 is also shown as being of substantially triangular cross-section, this is not essential for the operation of the device, but does assist the operator in aligning the fastener prior to insertion of the apertures, as will become more clear hereinafter.

Figure 3:
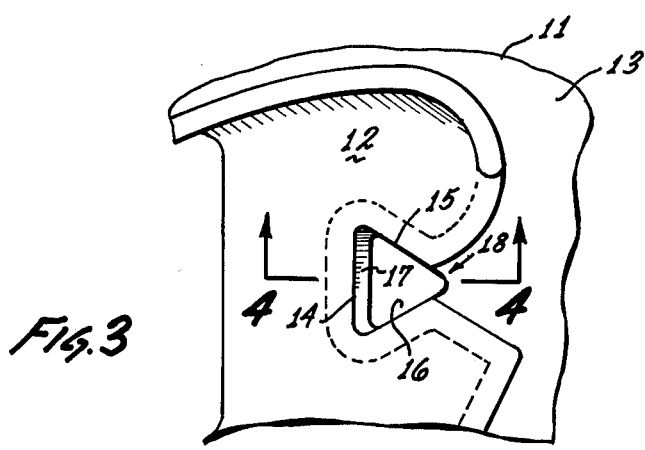
FIG. 3 is a plan view of a driving or driven member having an aperture into which the fastener of FIG. 1 may be inserted.
Figure 4:
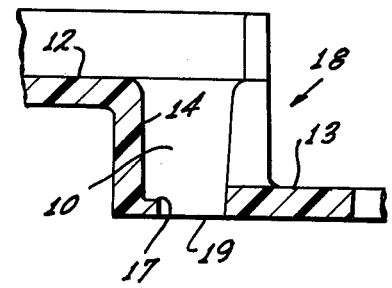
FIG. 4 is a cross-sectional view of the aperture shown in FIG. 3.

Referring now with particularity to FIGS. 3 and 4, wherein the aperture for receiving the fastener is shown in detail, it may be seen that this receiving aperture 10 is provided as part of a driven or driving member 11, of which only part is shown. Driving or driven member 11 is shown as having an upper ledge 12 and a lower ledge 13, but such is not necessarily true of all driving and driven members for which the present invention is suitable. Referring now to the plan view of FIG. 3, it may be seen that aperture 10 is of generally triangular cross-section defined by rear wall 14, right-hand wall 15, and left-hand wall 16. Although not obvious from the figures, it is possible to fabricate aperture 10 by means of conventional plastic molding techniques used also to fabricate the balance of member 11, in which case the aperture will not be of absolutely constant cross-section, but will have a slight taper to it to permit the finished member to be released from the mold. Towards the bottom of aperture 10 is a ledge 17 defined at the base of rear wall 14. The purpose of this ledge, as will become more clear hereinafter, is to provide a means for locking the fastener in place in the aperture. The dimensions are such that first constant cross-section portion 5 is an interference fit in the region defined by ledge 17. Also provided as part of aperture 10 is a cut-away portion indicated by the arrow labeled 18. This cut-away portion extends downward from upper plane 12 to lower plane 13 and includes only a relatively small portion of the circumference of aperture 10. It is located directly across from rear wall 14 at the apex of the triangle defined by vertical walls 14, 15 and 16, as is clearly shown in the drawing (see also the cut-away view of FIG. 5). Although the bottom of aperture 10 is shown as an opening 19, obviously, it would also be possible for the bottom of the aperture to be in the form of a blind hole, but as will become more clear hereinafter, such a construction would not permit the fastener to be readily displaced from the aperture in the event disassembly and repair became necessary.

Figure 5:
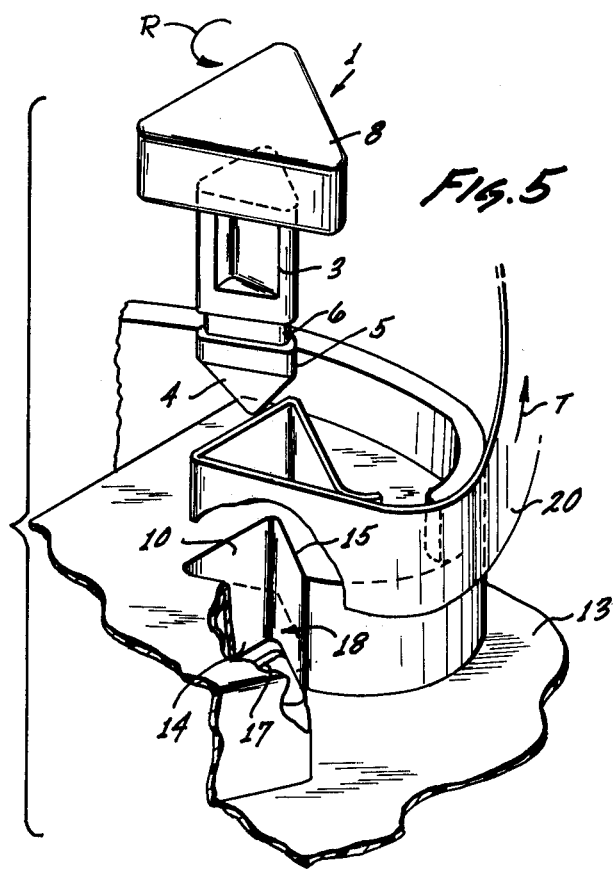
Figure 6:
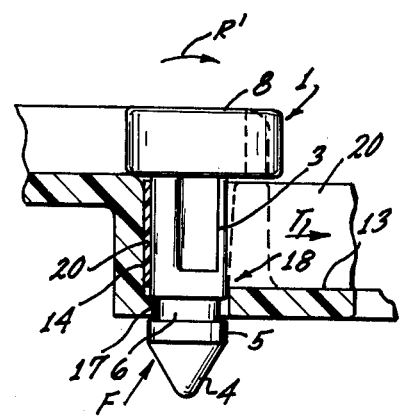
FIG. 6 shows partly in cross-section how the tape and fastener fit into the aperture upon assembly.

Referring now to FIG. 5 wherein the complete assembly comprising the fastener, the tape, and the aperture are shown in an exploded assembly view, it may be seen that one end of flexible drive tape 20 is formed into a loop and inserted into aperture 10 with both the long length of tape and a small portion of the end of the tape permitted to protrude through opening 18, and the fastener 1 may then be pushed into said loop until recessed portion 6 of the fastener engages ledge 17 of the aperture whereupon the whole assembly is secured. Tapered lead-in portion 4 facilitates such an insertion operation. Inasmuch as the fastener is of triangular rather than round cross-section, when tension is exerted on the tape in the direction of the arrow labeled T, it may be seen that this tension is transferred to fastener 1 and tends to rotate it clockwise in the direction indicated by the arrow labeled R. This introduces a cam effect which tends to wedge the vertices of constant cross-section portion 3 against the tape with a high force which counteracts the tension on tape 20 thereby preventing the tape from being pulled out of aperture 10. Referring now to the cross-sectional view of FIG. 6 which shows fastener 1 and tape 20 in place in the corresponding aperture with reduced cross-section portion 6 engaging ledge 17, it may be seen that as tension is exerted on tape 20 in the direction indicated by the arrow T, this will cause fastener 1 to tilt in the direction of the arrows R R$^1$, inasmuch as the fastener is slightly looser towards the top than the bottom as the result of the construction of front walls 16. The net effect of this tilting is to cause fastener 1 to become more firmly engaged with ledge 17 thereby preventing it from being pulled out. If, however, it is desired to remove the fastener, this is accomplished by exerting on the exposed bottom tapered portion a force in the direction indicated by the arrow F which will both push the fastener out and away from ledge 17. Although the dimensions of the fastener and the aperture are such that the fit is tight (preferably an interference fit during insertion), and some slight distortion to fastener 15, particularly in the vicinity of first constant cross-section portion 5, results when the fastener is being pushed into or out of contact with ledge 17; nevertheless, with appropriate choice of dimensions and materials, it is possible to fabricate a fastener which securely remains in position and which need not be distorted in assembly or use to the point where the fastener once inserted and removed cannot be again inserted and held securely in place.

Although the invention has been described in detail with reference to a particular embodiment which was intended to be fabricated out of molded ABS plastic components and .015 inch × .250 inch polypropylene tape, it may be seen that the invention with minor modifications and adaptions such as will readily occur to those skilled in the art to which it pertains may find many and varied applications without departing from its spirit.

What is claimed is:

1. Apparatus for attaching flexible tape to a part comprising:
    a trilaterally symmetric retainer having an axis of symmetry and having disposed from one end of said axis to the other:
        a first portion defining a tapered lead;
        a second portion of constant cross-section;
        a third portion of constant cross-section having a smaller cross-section than that of said second portion;
        a fourth portion of constant cross-section having essentially the same cross-section as said second portion; and
        a fifth portion defining a head having a cross-section larger than said first portion;
    a flexible tape; and
    an aperture for receiving said retainer defined on said part and having an upper plane and an opening having a first portion of substantially constant cross-section extending downward from said upper plane with a cutaway portion extending downward from said plane along a relatively small portion of the circumference of said opening for the introduction of said tape.

2. The apparatus of claim 1 wherein said second and third portion retainer cross-sections are essentially those of an equilateral triangle, whereby said retainer may be introduced into said opening in any one of three positions.

3. The apparatus of claim 2 wherein said receiving aperture opening includes a smaller cross-section downward extension which defines a ledge at the bottom of said first portion of said opening.

4. The apparatus of claim 3 wherein said ledge is defined at a location remote from said cutaway portion whereby tension applied to said tape will tend to force said second portion of said retainer into tighter contact with said ledge.

5. A method for retaining a flexible tape comprising the steps of:
    a. forming an open loop at one end of said tape;
    b. introducing said open loop into a substantially triangular opening having a slot at one vertex thereof; and
    c. forcing a triangular plug through the loop in said tape, thereby securing it in said opening.

6. The method of claim 5 further comprising the additional step of continuing to force said plug into said opening until a recessed portion of said plug engages a ledge at the bottom of said opening.

\* \* \* \* \*